United States Patent
Martin

(10) Patent No.: US 9,365,248 B1
(45) Date of Patent: Jun. 14, 2016

(54) TELESCOPIC TRAILER BED EXTENSION

(71) Applicant: Marty Martin, Girard, OH (US)

(72) Inventor: Marty Martin, Girard, OH (US)

(*) Notice: Subject to any disclaimer, the term of this patent is extended or adjusted under 35 U.S.C. 154(b) by 0 days.

(21) Appl. No.: 14/624,616

(22) Filed: Feb. 18, 2015

(51) Int. Cl.
*B62D 33/03* (2006.01)
*B62D 33/10* (2006.01)
*B62D 33/027* (2006.01)

(52) U.S. Cl.
CPC ............ *B62D 33/10* (2013.01); *B62D 33/0273* (2013.01); *B62D 33/03* (2013.01)

(58) Field of Classification Search
CPC ..... B62D 33/10; B62D 33/03; B62D 33/0273
See application file for complete search history.

(56) References Cited

U.S. PATENT DOCUMENTS

| | | |
|---|---|---|
| 2,729,499 A | 1/1956 | Eggum |
| 4,951,991 A | 8/1990 | Haigler |
| 5,938,262 A | 8/1999 | Mills |
| D441,340 S | 5/2001 | Whiteford |
| 6,491,331 B1 | 12/2002 | Fox |
| 6,860,536 B1 | 3/2005 | Schimunek |
| 7,052,033 B2 * | 5/2006 | McDonell ............... B60D 1/155 280/639 |
| 8,020,911 B2 | 9/2011 | McKelvey |

FOREIGN PATENT DOCUMENTS

WO    WO2006137996 A1    12/2006

* cited by examiner

*Primary Examiner* — Glenn Dayoan
*Assistant Examiner* — Melissa A Black
(74) *Attorney, Agent, or Firm* — Kyle A. Fletcher, Esq.

(57) ABSTRACT

The telescopic trailer bed extension is an accessory that is installed on an existing trailer in order to extend the useful surface of a trailer bed by locking the tailgate in a parallel orientation with the trailer bed. The telescopic truck bed extension includes a pair of telescoping members that are slideably engaged on a bottom surface of the trailer bed. The telescoping members extend rearwardly so as to extend beyond the trailer bed, and enable the tailgate to rest thereon in a parallel orientation with respect to the trailer bed. The telescoping members are each further defined with an inner member and an outer member. The tailgate includes a pair of tailgate brackets that align with and secure to inner members of the telescoping members.

16 Claims, 4 Drawing Sheets

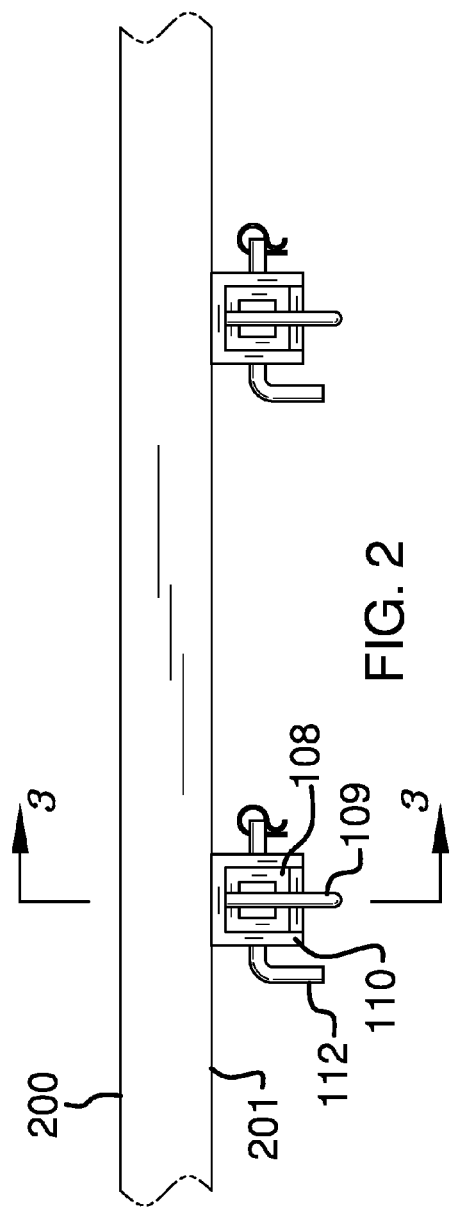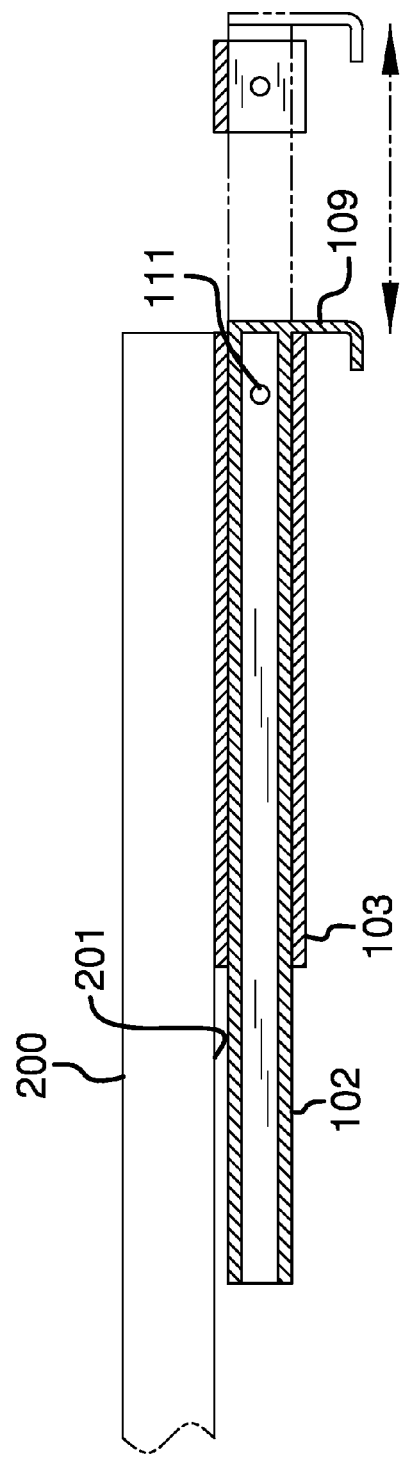

TELESCOPIC TRAILER BED EXTENSION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of trailer accessories, more specifically, a device that extends the useful surface of a trailer bed.

SUMMARY OF INVENTION

The telescopic trailer bed extension is an accessory that is installed on an existing trailer in order to extend the useful surface of a trailer bed by locking the tailgate in a parallel orientation with the trailer bed. The telescopic trailer bed extension includes a pair of telescoping members that are slideably engaged on a bottom surface of the trailer bed. The telescoping members extend rearwardly so as to extend beyond the trailer bed, and enable the tailgate to rest thereon in a parallel orientation with respect to the trailer bed. The telescoping members are each further defined with an inner member and an outer member. The inner member slides into and out of the outer member. The outer member is rigidly affixed to the bottom surface of the trailer bed. The tailgate includes a pair of tailgate brackets that align with and secure to the inner member of the telescoping members.

These together with additional objects, features and advantages of the telescopic trailer bed extension will be readily apparent to those of ordinary skill in the art upon reading the following detailed description of the presently preferred, but nonetheless illustrative, embodiments when taken in conjunction with the accompanying drawings.

In this respect, before explaining the current embodiments of the telescopic trailer bed extension in detail, it is to be understood that the telescopic trailer bed extension is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the telescopic trailer bed extension.

It is therefore important that the claims be regarded as including such equivalent construction insofar as they do not depart from the spirit and scope of the telescopic trailer bed extension. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a front view of an embodiment of the disclosure.

FIG. 3 is a cross-sectional view of an embodiment of the disclosure along line 3-3 in FIG. 2.

DETAILED DESCRIPTION OF THE EMBODIMENT

Figure 1:
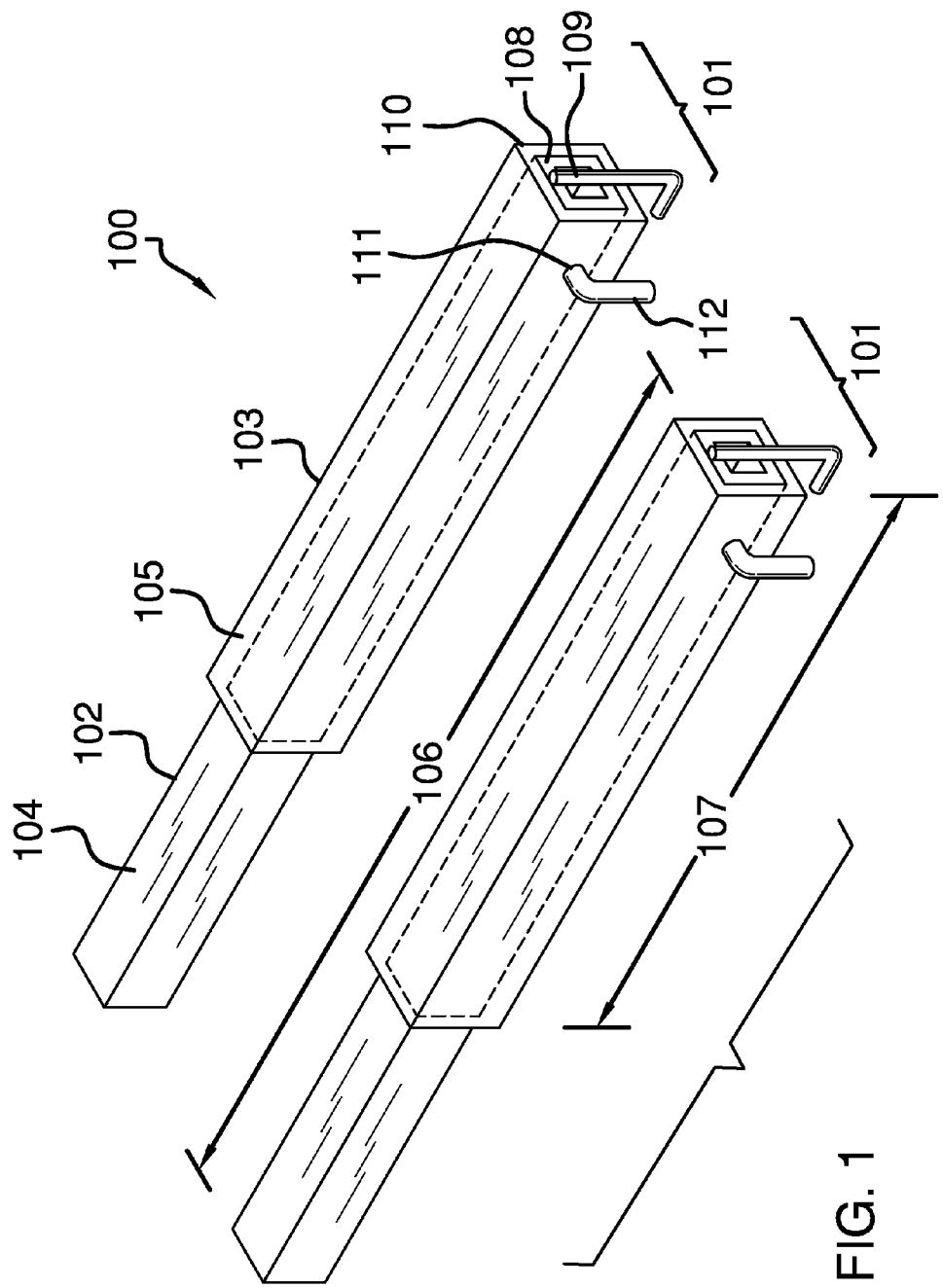
FIG. 1 is a perspective view of an embodiment of the disclosure.
Figure 4:
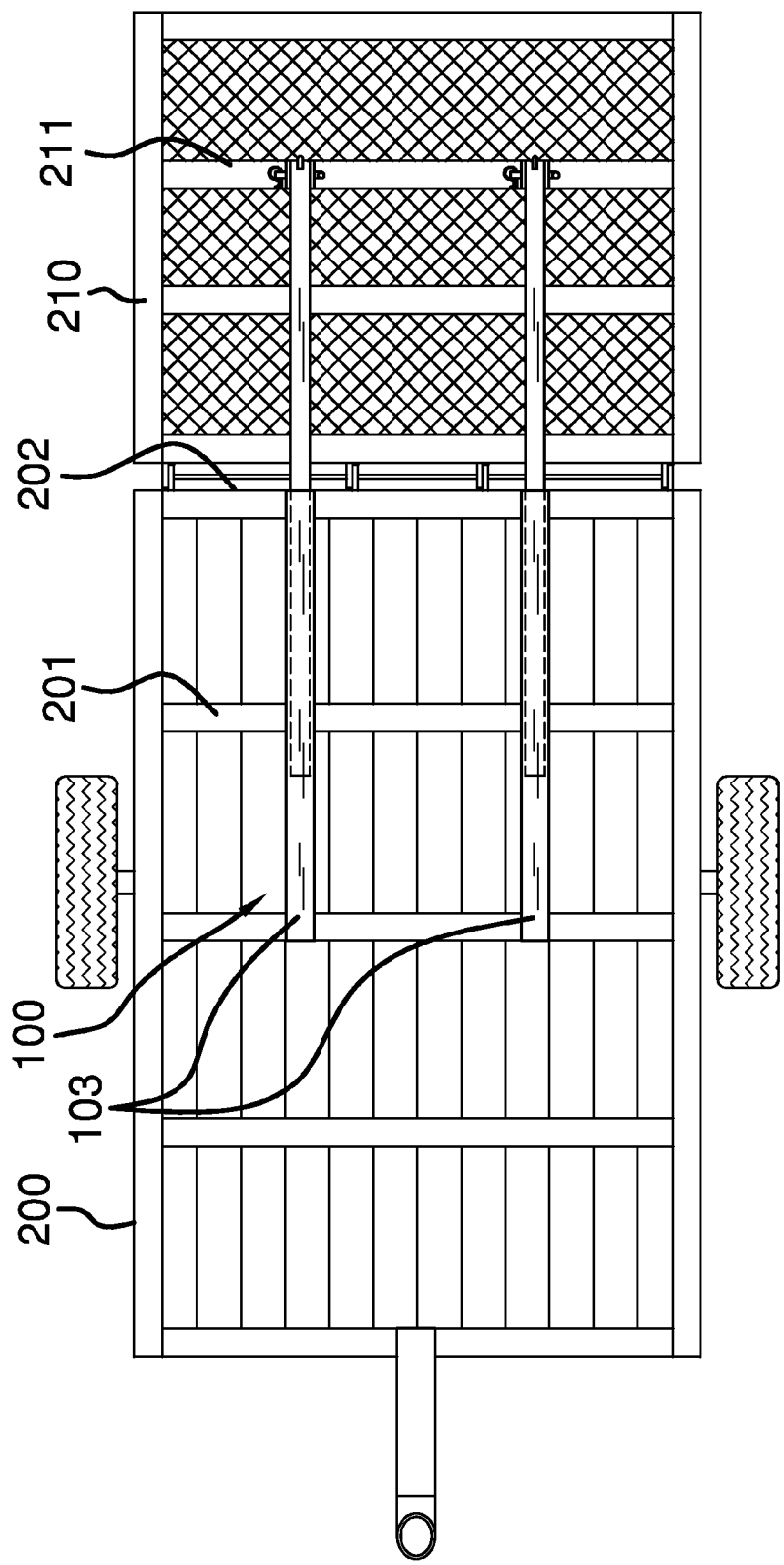
FIG. 4 is a bottom view of an embodiment of the disclosure.
Figure 5:
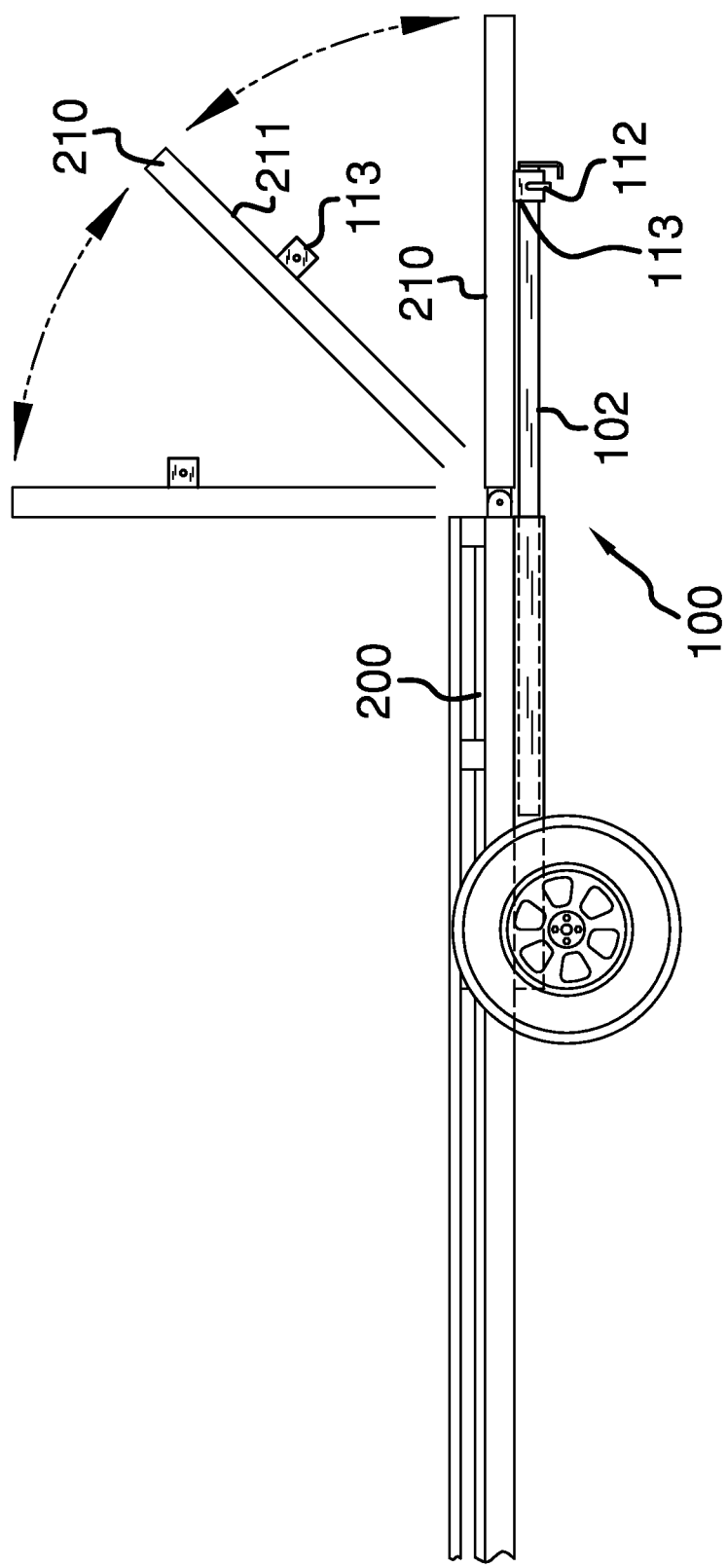
FIG. 5 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The telescopic trailer bed extension 100 (hereinafter invention) comprises at least one telescoping member 101 that is adapted to be affixed to a bottom surface 201 of a trailer bed 200. The at least one telescoping member 101 is further defined with an inner member 102 and an outer member 103. The inner member 102 is slideably engaged with respect to the outer member 103. The outer member 103 is rigidly affixed to the bottom surface 201 of the trailer bed 200. The inner member 102 and the outer member 103 may be pieces of square stock, and may be made of a material comprising wood, metal, carbon fiber composite, or plastic. Ideally, the inner member 102 and the outer member 103 are made of a metal as the trailer bed 200 is typically constructed of metal or a metal and wood hybrid.

The inner member 102 is able to extend and retract with respect to the outer member 103. Moreover, the inner member 102 extends rearwardly with a rear edge 202 of the trailer bed 200. The inner member 102 is adapted to support a trailer tailgate 210 in a parallel orientation with respect to the trailer bed 200. The inner member 102 is further defined with a top, inner surface 104 that is adapted to engage with and against an outer tailgate surface 211 of the trailer tailgate 210. Moreover, the outer member 103 is further defined with a top, outer surface 105. The top, outer surface 105 is adapted to be rigidly affixed to the bottom surface 201 of the trailer bed 200.

The inner member 102 is further defined with an inner length 106, which is less than an outer length 107 of the outer member 103. Referring to FIGS. 1 and 3, the inner member 102 slides from a partially nested state within the outer member 103. Moreover, the inner member 102 includes an inner end 108 that has a stop member 109 affixed thereon. The stop member 109 prevents the inner member 102 from sliding beyond an outer end 110 of the outer member 103. The stop member 109 also aids in retrieving the inner member 102 in order to extend the inner member 102 from the outer member 103.

The inner member 102 and the outer member 103 both include a pin hole 111 that enables a locking pin 112 to secure the inner member 102 in a fully seated position with respect to the outer member 103. The use of the pin hole 111 and the locking pin 112 prevents the inner member 102 from extending when the trailer bed 200 is in transit. The pin hole 111 of the inner member 102 is conversely used to secure the inner member 102 to a tailgate bracket 113. The tailgate bracket 113 is adapted to be rigidly affixed to the outer tailgate surface 211 of the trailer tailgate 210. The tailgate bracket 113 secures the inner member 102 to the trailer tailgate 210 when extended. The tailgate bracket 113 is rigidly affixed to the outer tailgate surface 211 at a predetermined locale so as to properly align with the pin hole 111 of the inner member 102 where the inner member 102 is extended with respect to the outer member 103.

The inner member 102 is adapted to support the trailer tailgate 210 at a parallel orientation with the trailer bed 200 in order to extend the overall useful surface area of the trailer bed 200. The tailgate bracket 113 is adapted to be rigidly affixed to the trailer tailgate 210 via welding. The same can be said for the rigid affixation of the outer member 103 onto the bottom surface 201 of the trailer bed 200.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A telescopic trailer bed extension comprising
at least one telescoping member that is adaptively affixed to a bottom surface of a trailer bed;
wherein the at least one telescoping member is able to extend rearwardly of the trailer bed in order to adaptively support a trailer tailgate in a parallel orientation with respect to said trailer bed in order to extend an overall useful surface area of said trailer bed;
wherein the at least one telescoping member is further defined with an inner member and an outer member; wherein the inner member is slideably engaged with respect to the outer member;
wherein the outer member is rigidly affixed to the bottom surface of the trailer bed; wherein the inner member and the outer member are pieces of square stock;
wherein the inner member is able to extend and retract with respect to the outer member; wherein the inner member extends rearwardly of a rear edge of the trailer bed;
wherein the inner member is adapted to support the trailer tailgate in a parallel orientation with respect to the trailer bed; wherein the inner member is further defined with a top, inner surface that is adapted to engage with and against an outer tailgate surface of the trailer tailgate.

2. The telescopic trailer bed extension according to claim 1 wherein the outer member is further defined with a top, outer surface; wherein the top, outer surface is adapted to be rigidly affixed to the bottom surface of the trailer bed.

3. The telescopic trailer bed extension according to claim 2 wherein the inner member is further defined with an inner length, which is less than an outer length of the outer member.

4. The telescopic trailer bed extension according to claim 3 wherein the inner member includes an inner end that has a stop member affixed thereon; wherein the stop member prevents the inner member from sliding beyond an outer end of the outer member.

5. The telescopic trailer bed extension according to claim 4 wherein the stop member also aids in retrieving the inner member in order to extend the inner member from the outer member.

6. The telescopic trailer bed extension according to claim 5 wherein the inner member and the outer member both include a pin hole that enables a locking pin to secure the inner member in a fully seated position with respect to the outer member; wherein the pin hole and the locking pin prevents the inner member from extending when the trailer bed is in transit.

7. The telescopic trailer bed extension according to claim 6 wherein the pin hole of the inner member is also used to secure the inner member to a tailgate bracket.

8. The telescopic trailer bed extension according to claim 7 wherein the tailgate bracket is adapted to be rigidly affixed to the outer tailgate surface of the trailer tailgate; wherein the tailgate bracket secures the inner member to the trailer tailgate when extended; wherein the tailgate bracket is rigidly affixed to the outer tailgate surface at a predetermined locale so as to properly align with the pin hole of the inner member where the inner member is extended with respect to the outer member.

9. A telescopic trailer bed extension comprising
at least one telescoping member that is adaptively affixed to a bottom surface of a trailer bed;
wherein the at least one telescoping member is able to extend rearwardly of the trailer bed in order to adaptively support a trailer tailgate in a parallel orientation with respect to said trailer bed in order to extend an overall useful surface area of said trailer bed;
wherein the at least one telescoping member is further defined with an inner member and an outer member; wherein the inner member is slideably engaged with respect to the outer member;
wherein the outer member is rigidly affixed to the bottom surface of the trailer bed; wherein the inner member and the outer member are pieces of square stock;
wherein the inner member is able to extend and retract with respect to the outer member; wherein the inner member extends rearwardly of a rear edge of the trailer bed;
wherein the inner member is adapted to support the trailer tailgate in a parallel orientation with respect to the trailer bed; wherein the inner member is further defined with a top, inner surface that is adapted to engage with and against an outer tailgate surface of the trailer tailgate.

10. The telescopic trailer bed extension according to claim 9 wherein the outer member is further defined with a top, outer surface; wherein the top, outer surface is adapted to be rigidly affixed to the bottom surface of the trailer bed.

11. The telescopic trailer bed extension according to claim 10 wherein the inner member is further defined with an inner length, which is less than an outer length of the outer member.

12. The telescopic trailer bed extension according to claim 11 wherein the inner member includes an inner end that has a stop member affixed thereon; wherein the stop member prevents the inner member from sliding beyond an outer end of the outer member.

13. The telescopic trailer bed extension according to claim 12 wherein the stop member also aids in retrieving the inner member in order to extend the inner member from the outer member.

14. The telescopic trailer bed extension according to claim 13 wherein the inner member and the outer member both include a pin hole that enables a locking pin to secure the inner member in a fully seated position with respect to the outer member; wherein the pin hole and the locking pin prevents the inner member from extending when the trailer bed is in transit.

15. The telescopic trailer bed extension according to claim 14 wherein the pin hole of the inner member is also used to secure the inner member to a tailgate bracket.

16. The telescopic trailer bed extension according to claim 15 wherein the tailgate bracket is adapted to be rigidly affixed to the outer tailgate surface of the trailer tailgate; wherein the tailgate bracket secures the inner member to the trailer tailgate when extended; wherein the tailgate bracket is rigidly affixed to the outer tailgate surface at a predetermined locale so as to properly align with the pin hole of the inner member where the inner member is extended with respect to the outer member.

\* \* \* \* \*